B. S. & M. R. Pierce,
Tile Machine,
No. 1,897, Reissued Feb. 28, 1865.
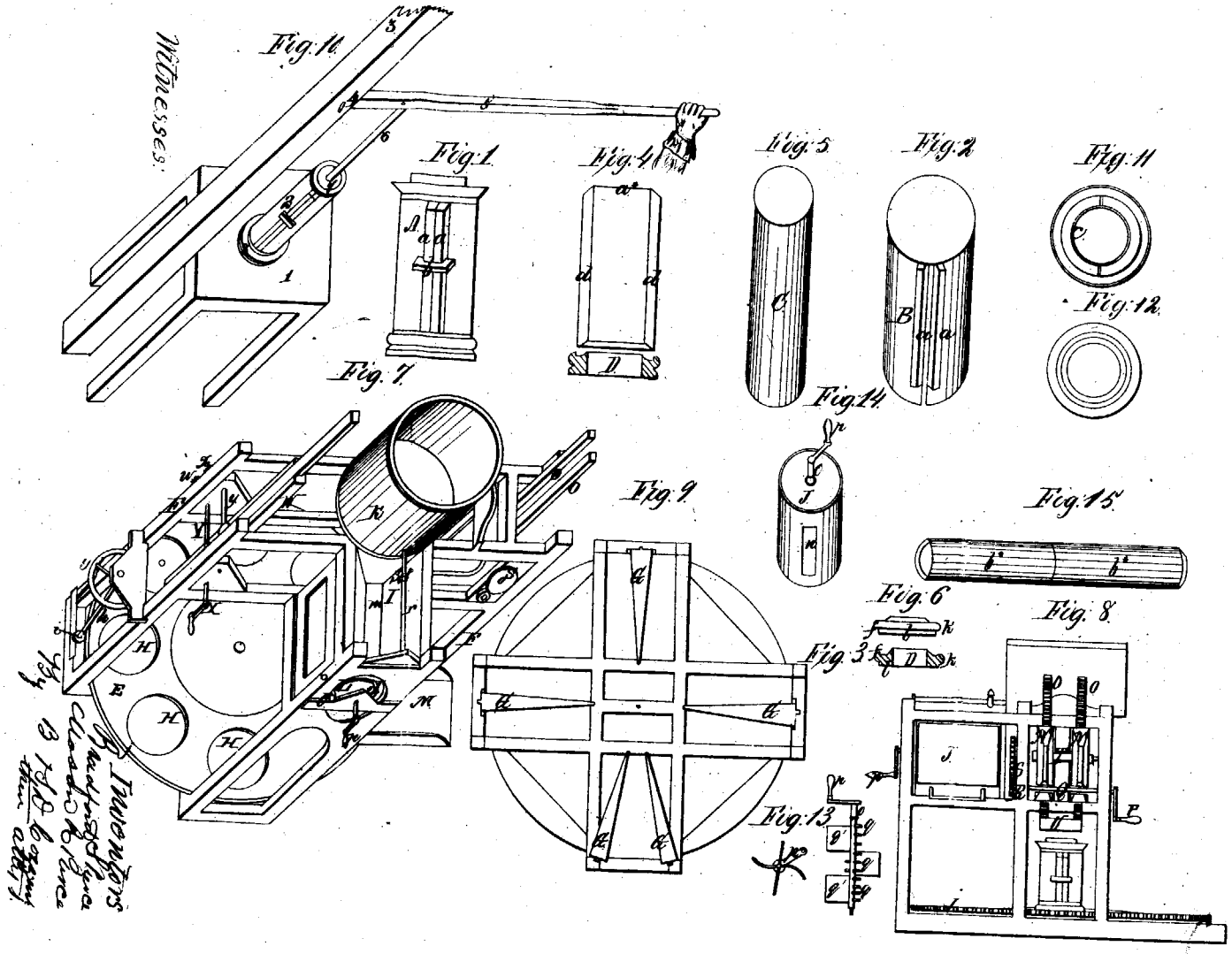

UNITED STATES PATENT OFFICE.

BRADFORD S. PIERCE, OF NEW YORK, N. Y., AND MASON R. PIERCE, OF MANSFIELD, MASSACHUSETTS.

MACHINE FOR MAKING DRAIN-PIPES.

Specification forming part of Letters Patent No. 23,703, dated April 19, 1859; Reissued February 28, 1865, No. 1,897.

*To all whom it may concern:*

Be it known that we, BRADFORD S. PIERCE, of the State, county, and city of New York, and MASON R. PIERCE, of Mansfield, in the county of Bristol and State of Massachusetts, have invented a new and useful improvement in molds for the manufacture of pipes or tubes for drains, flues, or other similar purposes and also in machinery to be used in connection therewith; and we do hereby declare that the following is a full, clear, and exact description of the same, reference being had to the drawing which accompanies and forms a part of this specification.

Of this drawing Figure 1 represents a front elevation of an improved mold which constitutes a part of our invention. Fig. 2 is a perspective view of the "case" portion of said mold. Fig. 3 is a vertical cross section of the "core socket" portion thereof. Fig. 4 is another vertical section of said core socket, and also of a finished pipe as made in our mold. Fig. 5 is a perspective view of the core used with our mold. Fig. 6 is a side elevation of the bevel ring which forms the concaved end of the pipe. Fig. 7 is a perspective view of our improved machinery for use, when desired, in connection with our mold. Fig. 8 is a front elevation of said machinery showing a mold in proper position for forming a pipe. Fig. 9 is a plan of a portion of the said machinery. Fig. 10 is a perspective view of a modification of our said machinery, showing a very simple form thereof. Figs. 11, 12, 13, and 14 are details of some of the same parts represented in the other figures, and, Fig. 15 is a perspective view of two lengths of finished pipe represented as put together for use.

In all the figures, similar letters denote similar parts.

Letters Patent of the United States were heretofore on the first day of August, 1854, obtained by the said BRADFORD S. PIERCE, together with one Charles M. Pierce for an "Improvement in molds for cement or earthen tubes," consisting principally of what is termed in said patent a "spring case," to be used in combination with a core for molding pipes of the description mentioned. In making use of said improvement it has been customary after the pipe is molded, and the core and case removed, to place the pipe on its side and let it stand until it is fully "set." This method of operation answers an excellent purpose for making pipes of comparatively small diameter, but when applied to large pipes, say of eight inches in diameter, experience has shown that the weight of the pipe, when the latter is laid upon its side, will cause the pipe before it has set to sag down and become more or less oval in shape, thereby greatly diminishing its value for use. It is mainly to remedy this evil, that we have devised our present improvements.

To enable those skilled in the art, to construct and employ our invention, we will proceed to describe one mode in which we have successfully put them into operation.

A, Fig. 1, is our improved mold. It is composed of a "case," a core, and what we term a "core socket," and as shown in said figure, the different parts of it are put together as they are when in use. The case B of this mold is made of thin metal, or of any other proper material, and is capable of being opened, and is provided with means of fastening its sides together, which, in the form shown in the drawing, is effected by securing strips of wood or other material, *a*, *a*, to these sides, and holding them closely together by the clamp *b*. The core, C, is of wood, metal, or other proper material, and when the mold is ready for use, the case is made to stand over it, as seen at Fig. 1, and is, by the stay *c*, Fig. 11, retained at an equal distance from it all around, the space left between the core and the case being the same in width as the intended thickness of the walls *d*, *d*, of the pipe to be molded. The core socket D, is a very important part of our invention and as shown in the drawing, is in shape somewhat like a short cylinder and is hollow, having an internal diameter just great enough to permit the core to be made to pass through it, when desired, without the expenditure of very considerable force, and, when constructed in the manner which we prefer, is, at its upper edge, provided with a beveled ring, which, in the molding, serves to form the concaved lower end of the pipe, and also with a flange or lip *f*, which, when the case is in place, holds it externally in proper position in the mold.

The machinery which we have devised to be employed, when desired, in connection with our mold, consists of a platform E, Fig. 7, which is capable of being revolved, within the frame work F, upon the conical rollers G seen at Fig. 9, by means of the hand wheel *g*. This hand wheel is fixed upon the upper end of a vertical spindle *h* working in suitable bearings in the frame work, and having at its other end, a pinion *i* which gears with teeth *j* on the perimeter of the platform E. H, H, are apertures in the platform in which molds constructed in the manner already described are to be set, to be carried around on the platform to be filled and then emptied for use again.

In order to properly secure the molds in the apertures while these operations are being performed, we have preferred to make our core sockets with a shoulder *k*, formed by the under side of the projecting lip *f*, and to give to the apertures a diameter just great enough to receive the lower part *l*, of the core sockets with a snug fit, letting the shoulder rest on the top of the platform, so that the entire mold may be readily and securely retained in an upright position while on the platform, and may also be easily removed when it is desired to discharge from it the finished pipe. I, is a hopper, with an open bottom *m*, secured at one side of the frame work F, and in it are placed the ingredients of which the pipe is to be composed, preparatory to their being mixed. Beneath the hopper is a hollow cylinder J, in which this mixing is effected. This cylinder rests on suitable journals working in bearings in the framework and is capable of being turned partly around by hand, one object of which is to bring the opening *n* in it, shown in Fig. 14, in line with the open bottom of the hopper I, in order to admit of the introduction into the cylinder of the ingredients to be mixed. Through the cylinder runs a shaft *o*, resting in proper bearings in the frame-work, and turned by the crank *p*. To this shaft are attached what we call "mixing pins and floats," or, in other words, stirrers, *q* and *q'*, which, when the shaft is rotated greatly facilitate the mixing, the cylinder during the operation being kept stationary. K, is a cistern placed over one end of the hopper I, and containing water to be used in mixing the ingredients, and *r* is a pipe running from the cistern and extending over the hopper, into which, as well as into the cylinder J through the opening *m*, water may be admitted by the faucet *s*, while the mixing is going on. L is a stop or projection on the exterior of the cylinder, so arranged that when the cylinder is revolved sufficiently far to bring the stop against the frame-work at *t*, the opening *m* in it will be in line with the open bottom of the hopper, so that the ingredients may be put in, and when in this position, the removable pin *n*, inserted through the frame-work, is employed to confine the stop between itself and the frame-work as seen in Fig. 7, so as to hold the cylinder stationary while the mixing is being performed. After the mixing is completed, the cylinder is revolved by hand partly around in the reverse direction until the stop strikes the frame-work at *v*, when the opening *m*, will be just over the spout M, so that its contents can be upset or "dumped" into the latter to be removed to the molds to form the pipe. When the stop is at *v*, another pin, not seen in the drawing, but operating like the pin *n*, may be inserted through the frame-work to hold the cylinder stationary while its contents are being dumped.

N, N, are guides in which travels a double rack O, O, which is operated by the crank P which turns the shaft Q, on which is keyed a pinion R, which meshes into a spur-gear S on the pinion shaft T, the leaves of which latter take into the teeth of the racks and thereby carry them up or down according as the crank P is turned.

To the lower ends of the racks O, O, is secured a concave headed piston U which moves up and down with the racks. V is a single rack moving in a guide W, and operated by the crank X, which turns the shaft Y, on which is keyed a pinion *w* which meshes into a spur gear *x* on another shaft *y* which latter carries a second pinion *z* which takes into the teeth of the rack V and thereby raises or lowers it. The piston U constitutes a tamper, for when the pipe is to be molded, the mold is brought around on the platform underneath it, and the piston is by the crank P driven down at intervals several times during the molding operation upon the ingredients in the mold, so as to force them into all parts of the space between the core and the case, and to consolidate them properly together, and by means of its concave head, it also, when the mold is filled, gives at its last stroke the proper convex form to the upper end of the finished pipe. The rack V constitutes what we term a "core reliever" for after each mold has been filled, it is carried by the platform underneath this rack and the latter is then by the crank X, forced down upon the core C, which is thus driven through the mold and core socket, and through the aperture H in the platform, into a pit below. Any convenient device may be employed in order to arrest the movement of the platform at the proper points respectively to stop the molds under the tamper U and the core reliever V. *a**, Fig. 4 is a semi-section of a finished pipe as it stands in the mold, and *b**, *b**, are two lengths of finished pipe connected together as they are when in use.

The operation of our invention is very simple. The platform having been revolved and stopped so as to bring one of the molds under the tamper U, the ingredients of which the pipes are to be composed, are placed in the hopper I in such proportions relatively to each other as are suitable, and the cylinder J is rotated until the opening *m* comes beneath the hopper. The cylinder is then stopped and secured, ingredients are introduced into it and sufficient water from the cistern K is, from time to time, let in among them through the hopper and the opening *m* to effect the mixing. The shaft *o*, with its stirrers is then turned until the contents of the cylinder are thoroughly mixed, when the cylinder is again rotated partly around so as to "upset" it, or, in other words, bring the opening *m* over the spout M. The mixture is then dumped into this spout, and carried away with shovels to the mold under the tamper, and thrown into it, and to facilitate this filling of the molds, we have sometimes constructed them with a flaring or funnel shaped top, as seen at *c** in Fig. 1. The tamper is then operated at intervals to consolidate the materials while the mold is being filled and to give the convex form to the upper end of the pipe, and as soon as the filling is completed, the platform is again revolved and stopped so as to bring the filled mold under the core reliever, when the latter is by the crank X forced down upon the core to drive it out into the core pit. After the core is discharged, the platform is once more revolved so as to bring the filled mold between the tamper and the hopper I, and the mold is then removed and the pipe as soon as it has "set," is taken out, and the mold is returned to the platform for further use. The same operation is repeated with all the molds in succession.

Our mold may be used without the aid of the machine above described, and in Fig. 10, will be seen one mode of so employing it. The mold with its socket is placed upon a suitable level base, such as in this figure, which represents a platform or table 1, having in its top an aperture large enough to receive and hold the core socket which, with the rest of the mold, may be held in place in it in the manner already described. The ingredients, after being properly mixed may be filled into the mold and rammed or tamped by hand. 2 is the mold setting in the aperture in the table. 3 is a post at one side of the table, and 4 is a pin in this post upon which works a hand lever 5. To this lever is attached a vertical rod or core reliever 6, which, when the lever is brought over, is forced against the top of the core 7, and drives it through the mold, core socket, and table, into a space or pit below the latter. In order to keep the top of the core in proper position during the filling process, the double ring clasp 8, upon which a hopper may be placed, may be applied to the top of the mold and core. This arrangement will be found to be very simple, cheap, and convenient.

We do not confine ourselves to the precise construction of parts shown in the drawing, nor do we limit ourselves to removing the core by forcing it through the mold case and core socket, while the latter named two parts remain stationary, as it is evident, the core itself may be stationary and be discharged from the rest of the mold by drawing or otherwise removing the core socket and mold case from around it. But having described one mode in which our inventions may be put in practice.

Having thus described our improvements, what we claim and desire to secure by Letters Patent, is:

1. A mold consisting of a case capable of being properly secured around the material while the pipe is being molded and of being freed from the pipe when the molding is completed, in combination with a core, and also with a core socket having a provision for freeing the socket or pipe or both from the core, the whole operating substantially as set forth.

2. The arrangement of the mixing apparatus and of the core relieving devices above the platform which conveys the molds, in the manner and for the purpose substantially as specified.

3. The combination of the core socket with the revolving disk which receives the core and the mold, when the disk contains a provision for enabling the socket or pipe or both to be freed from the core, the whole operating substantially as described.

BRADFORD S. PIERCE.
MASON R. PIERCE.

Witnesses:
ALEX. A. C. KLANCK,
C. D. SMITH.

[FIRST PRINTED 1911.]